(12) United States Patent
Sun et al.

(10) Patent No.: US 11,695,481 B2
(45) Date of Patent: Jul. 4, 2023

(54) LIGHT INTENSITY SIGNAL TRANSMITTING DEVICE BASED ON HIGH-SPEED LED ARRAY

(71) Applicant: Beihang University, Beijing (CN)

(72) Inventors: Mingjie Sun, Beijing (CN); Han Wang, Beijing (CN); Kuijun Li, Beijing (CN); Hongxu Huang, Beijing (CN); Wen Chen, Beijing (CN); Lijing Li, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 0 days.

(21) Appl. No.: 17/689,231

(22) Filed: Mar. 8, 2022

(65) Prior Publication Data
US 2022/0294533 A1 Sep. 15, 2022

(30) Foreign Application Priority Data

Mar. 9, 2021 (CN) .......................... 202110256513.9

(51) Int. Cl.
H04B 10/50 (2013.01)
F21V 23/00 (2015.01)
H04B 10/116 (2013.01)
H04B 10/69 (2013.01)
F21Y 105/18 (2016.01)
F21Y 115/10 (2016.01)

(52) U.S. Cl.
CPC ......... *H04B 10/502* (2013.01); *F21V 23/002* (2013.01); *H04B 10/116* (2013.01); *H04B 10/69* (2013.01); *F21Y 2105/18* (2016.08); *F21Y 2115/10* (2016.08)

(58) Field of Classification Search
None
See application file for complete search history.

(56) References Cited

U.S. PATENT DOCUMENTS

| 2016/0352423 | A1* | 12/2016 | Tay ..................... H04B 10/1141 |
| 2019/0074899 | A1* | 3/2019 | Joseph ................. H04B 10/116 |
| 2019/0181951 | A1* | 6/2019 | Bedell ................. H04B 10/803 |
| 2019/0268071 | A1* | 8/2019 | Lydecker ............. H04B 10/116 |

* cited by examiner

*Primary Examiner* — David W Lambert
(74) *Attorney, Agent, or Firm* — Harness, Dickey & Pierce, P.L.C.

(57) ABSTRACT

Disclosed is a light intensity signal transmitting device based on a high-speed LED array. The light intensity signal transmitting device includes an LED array and a control board card; through a novel arrangement and driving mode, the LED array has a high-speed modulation characteristic and can transmit high-bit light intensity information at the switching speed of single-point LEDs; the control board card performs high-speed display by gating an I/O port of the LED array, and is used as a light intensity signal transmitting end to transmit a light signal. According to the light intensity signal transmitting device, on the premise that the switching rate of the LED array is ensured, multi-bit binary data transmission is realized, and the transmission rate is improved.

5 Claims, 3 Drawing Sheets

102 cathode  anode

203

LIGHT INTENSITY SIGNAL TRANSMITTING DEVICE BASED ON HIGH-SPEED LED ARRAY

CROSS REFERENCE TO RELATED APPLICATION

This patent application claims the benefit and priority of Chinese Patent Application No. 202110256513.9 filed on Mar. 9, 2021, the disclosure of which is incorporated by reference herein in its entirety as part of the present application.

TECHNICAL FIELD

The present disclosure belongs to the technical field of wireless communication, and particularly relates to a light intensity signal transmitting device based on a high-speed LED array.

BACKGROUND ART

The LED has a very high switching speed, but there is a tradeoff between the number of I/O ports and the switching speed to allow the LED array display to achieve the switching speed of the LED. The demand for I/O port is larger along with the increase of the resolution of the LED. The conventional row-by-row/column-by-column scanning strategy can obviously reduce demand for the I/O port but the price is reduction of the refreshing frequency of the LED array.

There are single-input and single-output (SISO) systems and multiple-input and multiple-output (MIMO) systems in wireless optical communication. The SISO system has the advantage of simplicity, but the data transmission rate is relatively low. The MIMO systems relax the strict alignment requirement of the transmitter and the receiver, but the LED array spatial channel has strong correlation which causes spatial crosstalk, so it is difficult to demodulate transmitted information.

SUMMARY

In order to overcome the defects in the prior art, the present disclosure provides a light intensity signal transmitting device based on a high-speed LED array, and aims to improve the data transmission rate. The technical solution of the present disclosure is as follows.

A light intensity signal transmitting device based on an LED array includes the LED array and a control board card, where the control board card is formed with a signal input end, a transmission signal is pre-coded and then stored in a memory of the control board card, the LED array is connected with the control board card, the control board card outputs a control signal to a row control end and a column control end of the LED array, to output, in a one-time scanning mode, a pattern corresponding to the signal pre-coded, thereby implementing transmission through light signals; and a photodetector receives information transmitted by the LED array, when a number of LEDs in the LED array is $2^n$, any n-bit binary data from 0 to $2^n$ LEDs can be transmitted, and signals output by the photodetector pass through a high-precision analog-to-digital converter to recognize a number of lightened LEDs, thereby realizing data transmission.

Further, the LED array is controlled by row control lines and column control lines in a gating mode, a number of LEDs required to be lightened in the LED array is controlled in the one-time scanning mode, and response time of the LED array is equal to response time of a single LED.

Further, in an arrangement mode of the LED array, when a row with a largest number of LEDs with common anode or LEDs with common cathode is a central row, a number of LEDs with common anode or LEDs with common cathode in each row of other rows is gradually decreased to one towards an edge; and when a column with a largest number of LEDs with common anode or LEDs with common cathode is a central column, a number of LEDs with common anode or LEDs with common cathode in each column of other columns is gradually decreased to one towards an edge.

Further, gradually decreasing is to decrease gradually with a tolerance of 1 or 2.

When the number of the LEDs is gradually decreased with a tolerance of 1 from the central row or the central column, a gradual decreasing direction is from the central row or the central column towards two sides or only towards a single side.

When the number of the LEDs is gradually decreased with a tolerance of 2 from the central row or the central column, the number of the LEDs in the central row or the central column is an odd number, and a gradual decreasing direction is from the central row or the central column towards two sides.

Further, the LEDs with common anode or LEDs with common cathode in the LED array are arranged other than horizontally or vertically.

Further, the LED array is in a convex polygon shape, and any number of LEDs is lightened in the LED array.

Further, the LED array is square, triangular or parallelogram-shaped.

The present disclosure has the following beneficial effects.

The LED array is used for replacing a single LED to serve as a high-bit light intensity signal transmitting device for transmitting data at a transmitting end, but a common display mode of scanning according to rows and columns of the LED array will reduce the refreshing frequency. Along with the increase of the size of the LED array, longer binary data are transmitted in a single LED modulation time. When the number of the LEDs in the LED array is $2^n$, any n-bit binary data from 0 to $2^n$ LEDs can be transmitted. On the premise that the same single LED response time is guaranteed, multi-bit binary data transmission is achieved, and the transmission rate is improved.

BRIEF DESCRIPTION OF THE DRAWINGS

To more clearly illustrate the embodiment of the present disclosure or the technical solution in the prior art, the following briefly introduces the accompanying drawings to be used in the embodiment. The features and advantages of the present disclosure are more clearly understood with reference to the accompanying drawings, and the accompanying drawings are schematic and are not to be construed as limitation of the present disclosure in any way. Those skilled in the art may still derive other accompanying drawings from these ones without paying creative efforts. In which.

Figure 1:
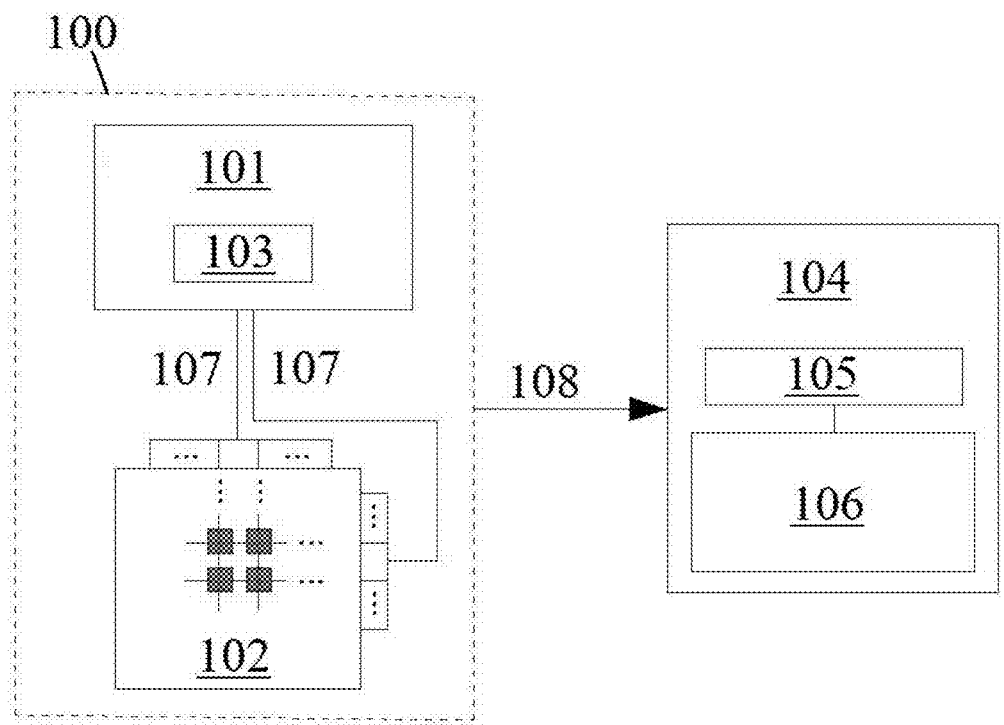
FIG. 1 is a schematic implementation diagram of a light intensity signal transmitting device based on an LED array.

List of reference signs; 100, transmitting device; 101, control board card; 102, LED array; 103, memory; 104, receiving end; 105, photodetector; 106, analog-to-digital converter; 107, control signal; 108, space link; 201, row control line; 202, column control line; 203, LED.

DETAILED DESCRIPTION OF THE EMBODIMENTS

To understand the foregoing objectives, features and advantages of the present disclosure more clearly, the present disclosure is further described in detail below with reference to the accompanying drawings and specific embodiments. It needs to be illustrated that under the compatible condition, the embodiments in the present disclosure and features in the embodiments can be combined.

Numerous specific details are set forth in the following description to provide thorough understanding of the present disclosure, but the present disclosure may be implemented otherwise than as described herein, and therefore, the scope of the present disclosure is not limited by the specific embodiments disclosed below.

In order to facilitate the understanding of the above-described technical solutions of the present disclosure, the above-described technical solutions of the present disclosure are described in detail below by way of specific embodiments, and the described schematic diagrams of the LED array are only some, but not all, embodiments of the present disclosure.

An LED array has a high-speed modulation characteristic through a novel arrangement and driving mode, and can transmit high-bit light intensity information at the switching speed of a single LED. The schematic diagrams of the LED array are as shown in FIG. 2 to FIG. 5. Specifically, a light intensity signal transmitting device 100 based on a high-speed LED array includes an LED array 102 and a control board card 101, where the control board card 101 is formed with a signal input end, a transmission signal is pre-coded and then stored in a memory 103 of the control board card 101, the LED array 102 is connected with the control board card 101, the control board card 101 outputs a control signal 107 to a row control end and a column control end of the LED array 102, to output a pattern corresponding to the pre-coded signal in a one-time scanning mode, thereby implementing transmission through light signals:

and a photodetector 105 receives information transmitted by the LED array 102, when the number of LEDs 203 in the LED array 102 is $2^n$, any n-bit binary data from 0 to $2^n$ LEDs 203 can be transmitted, and signals output by the photodetector 105 pass through a high-precision analog-to-digital converter 106 to recognize the number of the lightened LEDs 203, thereby realizing data transmission.

The LED array 102 is controlled by row control lines 201 and column control lines 202 in a gating mode, the number of LED points required to be lightened in the LED array 102 is controlled in the one-time scanning mode, and response time of the LED array 102 is equal to the response time of the single LED.

In the arrangement mode of the LED array 102, when a row with the largest number of LEDs 203 with common anode or LEDs 203 with common cathode is a central row, the number of the LEDs 203 with common anode or LEDs 203 with common cathode in each row of the rest of rows is gradually decreased to one towards the edge; and when a column with the largest number of LEDs 203 with common anode or LEDs 203 with common cathode is a central column, the number of the LEDs 203 with common anode or LEDs 203 with common cathode in each column of the rest of columns is gradually decreased to one towards the edge.

Figure 4:
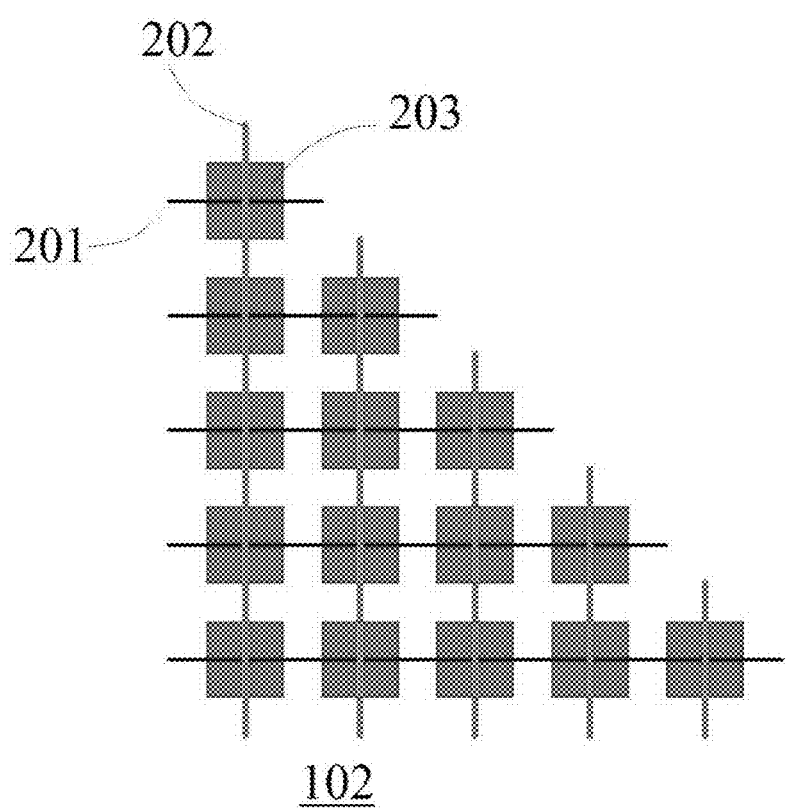
Figure 5:
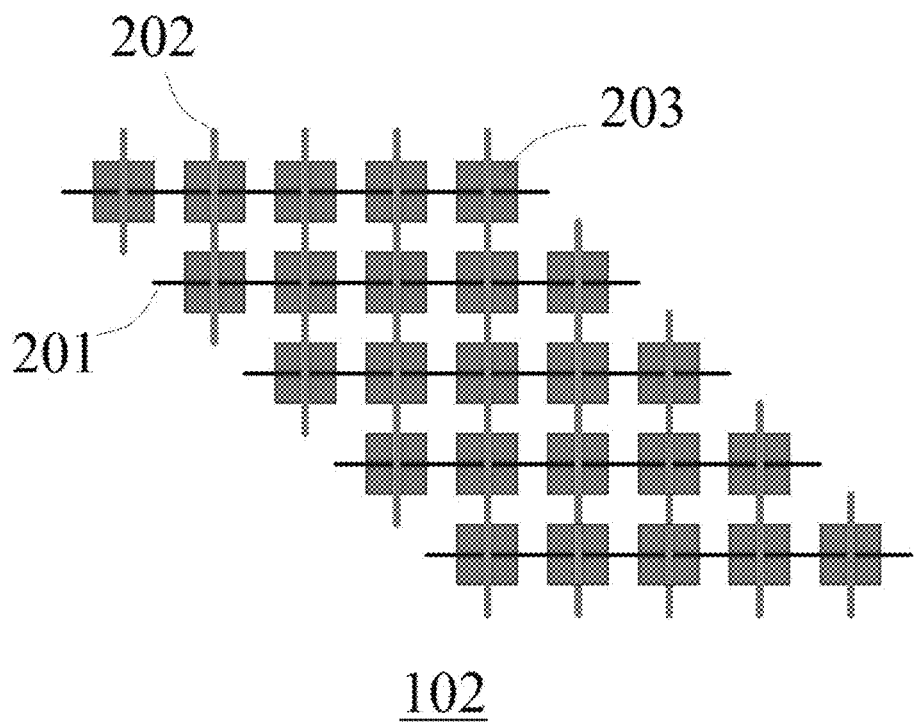

The progressive decreasing manner is progressive decreasing with a tolerance of 1 or 2; when the number of the LEDs 203 is progressively decreased with a tolerance of 1 from the central row or the central column, the progressive decreasing direction is from the central row or the central column towards two sides or only towards a single side; and when the number of the LEDs 203 is progressively decreased with a tolerance of 2 from the central row or the central column, the number of the LEDs 203 in the central row or the central column is an odd number, and the number of the LEDs 203 is progressively decreased from the central row or the central column towards two sides, as shown in FIG. 4 and FIG. 5.

Figure 3:
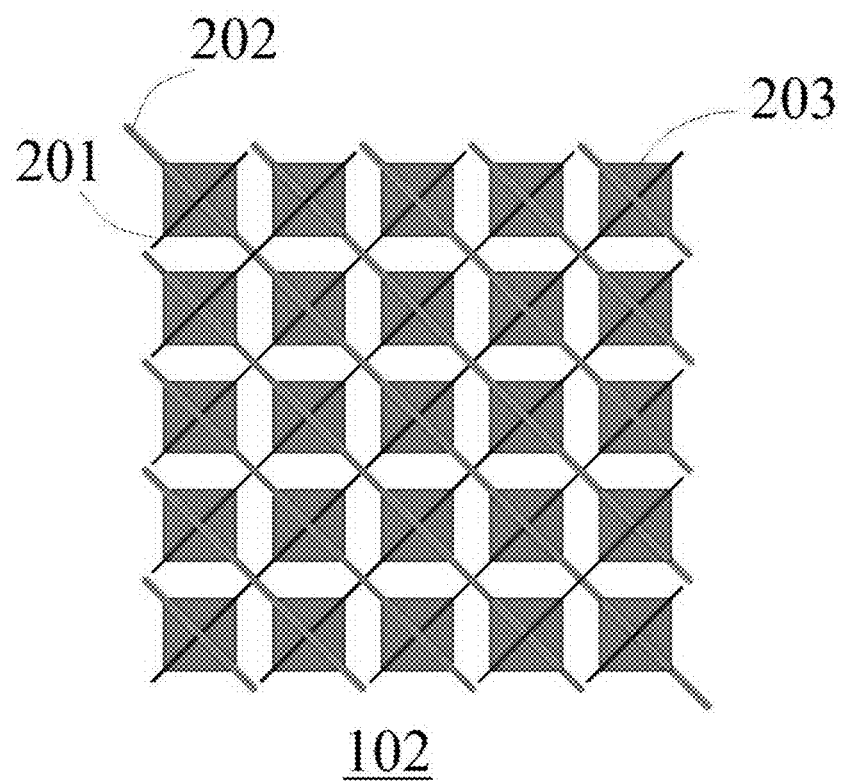

The LEDs 203 with common anode or LEDs 203 with common cathode in the LED array 102 can be arranged other than horizontally or vertically. As shown in FIG. 3, the utility rate of space is improved through the arrangement, when the row with the largest number of LEDs 203 with common anode or LEDs 203 with common cathode is the central row, the number of the LEDs 203 with common anode or LEDs 203 with common cathode in the rest of rows is gradually decreased to one towards the edge; and when the column with the largest number of LEDs 203 with common anode or LEDs 203 with common cathode is the central row, the number of the LEDs 203 with common anode or LEDs 203 with common cathode in the rest of columns is gradually decreased to one towards the edge.

Trough the arrangement mode, the LED array 102 can be in various shapes, such as a square, a triangle, a parallelogram or other convex polygons, and any number of LEDs 203 can be lightened in the LED array 102 through the arrangement.

The present disclosure provides a light intensity signal transmitting device 100 based on a high-speed LED array 102. A transmitting device 100 capable of transmitting high-bit light intensity information at the switching speed of the single LED is realized by utilizing the advantage of high-speed modulation of the LED array 102. The device has more digits of transmitted data and higher transmission rate in the same time. A specific method includes the following steps:

S1, pre-coding information to be transmitted by a control board card 101 of the light intensity signal transmitting device 100, storing the coded information, and realizing I/O port gating of the LED array 102;

S2, enabling the LED array 102 to be connected with the control board card 101, displaying transmission information patterns in sequence by a control signal 107 of a signal input end, outputting patterns corresponding to the coded information in the one-time scanning mode, thereby implementing transmission through light signals.

Figure 2:
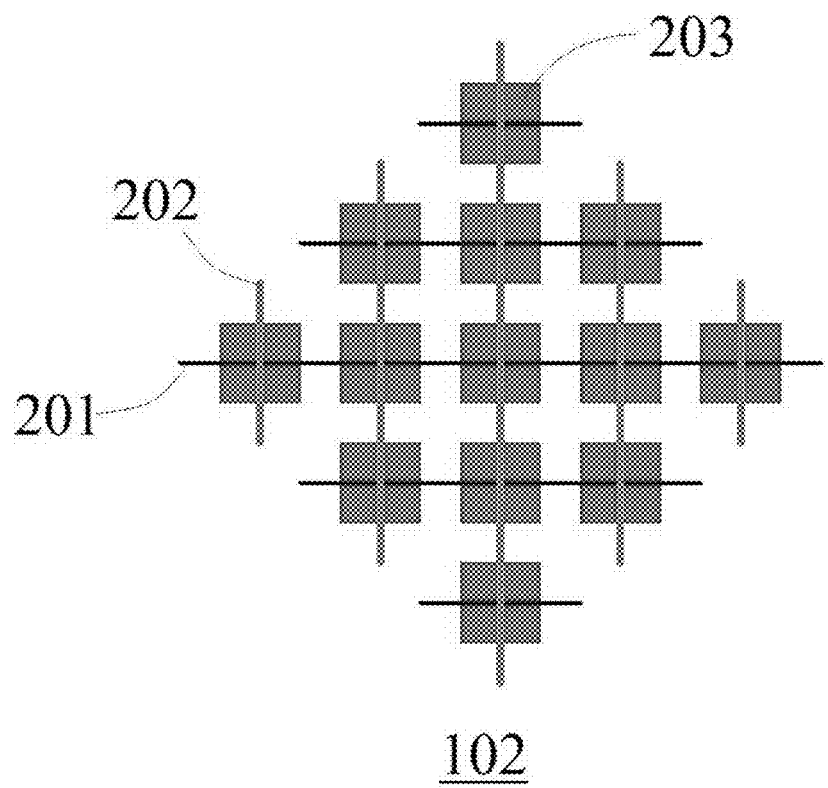
FIG. 2, FIG. 3, FIG. 4 and FIG. 5 are schematic diagrams of the LED array, respectively.

As shown in FIG. 2, the specific LED control method is as follows (displayed according to rows and columns): a pattern is displayed by a traditional LED array in a row-column scanning manner, namely when a control line of a certain row is set to be at a high level and a corresponding certain column is set to be at a low level, the LED at an intersection position of the corresponding row and the corresponding column is lightened. For an N*N LED dot matrix, N times of scanning are needed to complete the display of a pattern, so that the display speed of the LED array is greatly reduced. By directly assigning a code to an I/O port of the LED array, although only time for one-time scanning is needed for display, the condition that some patterns cannot be lightened can occur. According to the LED array 102 of the present disclosure, due to the particularity of arrangement and driving, after the LED array 102 is controlled by one-time scanning output through the I/O port of the control panel, lighting of any number of LEDs 203 can be achieved in one-time scanning, which is different from a common row/column scanning mode; multi-bit binary data transmission is achieved within the response time of the single LED, and the data rate is improved. When the number of the LEDs 203 in the LED array 102 is $2^n$, any n-bit binary data from 0 to $2^n$ LEDs 203 can be transmitted.

S3, after light beams are transmitted in the free space, collecting light signals by a receiving end 104 and carrying out A/D conversion, distinguishing the intensity of the single LED as a unit, and thus achieving transmission of multi-digit binary data.

Figure 6:
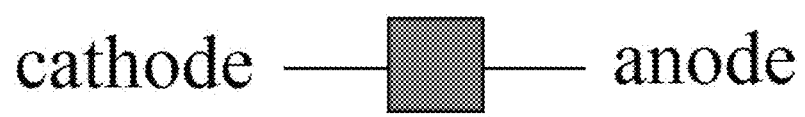
FIG. 6 is a schematic diagram of an LED in the LED array.

FIG. 6 is a schematic diagram of an LED in the LED array. As shown in FIG. 6, the LED includes an anode terminal and a cathode terminal.

The foregoing descriptions are merely exemplary embodiments of the present disclosure, but are not intended to limit the present disclosure, and for those skilled in the art, the present disclosure can be of various modifications and changes. Any modifications, equivalent replacements, or improvements made without departing from the spirit and principle of the present disclosure shall fall within the protection scope of the present disclosure.

What is claimed is:

1. A light intensity signal transmitting device based on an LED array, comprising the LED array and a control board card, wherein a transmission signal is pre-coded and then stored in a memory of the control board card as a pre-coded transmission signal, the LED array is connected with the control board card, the control board card outputs a control signal to a row control end and a column control end of the LED array, to output, in a one-time scanning mode, a pattern corresponding to the pre-coded transmission signal, thereby implementing transmission through light signals;

a photodetector receives information transmitted by the LED array, when a number of LEDs in the LED array is $2^n$, any n-bit binary data from 0 to $2^n$ LEDs can be transmitted, and signals output by the photodetector pass through an analog-to-digital converter to recognize a number of lightened LEDs, thereby realizing data transmission, wherein the LED array is controlled by row control lines and column control lines in a gating mode, a number of LEDs required to be lightened in the LED array is controlled in the one-time scanning mode, and response time of the LED array is equal to response time of a single LED, in an arrangement mode of the LED array, when a row with a largest number of LEDs with anodes connected together or LEDs with cathodes connected together is a central row, a number of LEDs with anodes connected together of LEDs with cathodes connected together in each row of other rows is gradually decreased to one towards an edge; and when a column with a largest number of LEDs with anodes connected together or LEDs with cathodes connected together is a central column, a number of LEDs with anodes connected together or LEDs with cathodes connected together in each column of other columns is gradually decreased to one towards an edge.

2. The light intensity signal transmitting device based on the LED array according to claim 1, wherein gradually decreasing is to decrease gradually with a tolerance of 1 or 2;

when the number of the LEDs is gradually decreased with a tolerance of 1 from the central row or the central column, a gradual decreasing direction is from the central row or the central column towards two sides or only towards a single side; and when the number of the LEDs is gradually decreased with a tolerance of 2 from the central row or the central column, the number of the LEDs in the central row or the central column is an odd number, and a gradual decreasing direction is from the central row or the central column towards two sides.

3. The light intensity signal transmitting device based on the LED array according to claim 1, wherein the LEDs with anodes connected together or LEDs with cathodes connected together in the LED array are arranged other than horizontally or vertically.

4. The light intensity signal transmitting device based on the LED array according to claim 2, wherein the LED array is in a convex polygon shape, and any number of LEDs is lightened in the LED array.

5. The light intensity signal transmitting device based on the LED array according to claim 4, wherein the LED array is square, triangular or parallelogram-shaped.

* * * * *